O. ZERK.
GREASE CUP.
APPLICATION FILED APR. 3, 1913.

1,138,527.

Patented May 4, 1915.

WITNESSES:
Oliver M. Kappler.
Justin W. Macklin

INVENTOR
Oscar Zerk
BY Albert T. L. Baker,
ATTORNEY.

UNITED STATES PATENT OFFICE.

OSCAR ZERK, OF CLEVELAND, OHIO, ASSIGNOR, BY MESNE ASSIGNMENTS, TO GEORGE W. BOWEN, OF AUBURN, NEW YORK.

GREASE-CUP.

1,138,527.  Specification of Letters Patent.  Patented May 4, 1915.

Application filed April 2, 1913. Serial No. 758,552.

*To all whom it may concern:*

Be it known that I, OSCAR ZERK, a subject of the Emperor of Austria-Hungary, residing at Cleveland, in the county of Cuyahoga and State of Ohio, have invented a certain new and useful Improvement in Grease-Cups, of which the following is a full, clear, and exact description, reference being had to the accompanying drawings.

This invention relates to grease cups of the type wherein there is a cup member, a cap member screw threaded thereto but stationary therewith in service, and a movable plunger within the cap member.

The object is to provide a simple and efficient spring means for locking the cap to the cup, prevent displacement of the cap but allowing the cap to be screwed into place or removed from the cup whenever desired. The spring detent is contained within the cup and is thus entirely hidden from view.

The invention is hereinafter more fully explained and its essential characteristics are summarized in the claims.

Figure 1:
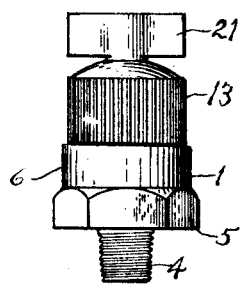
Figure 2:
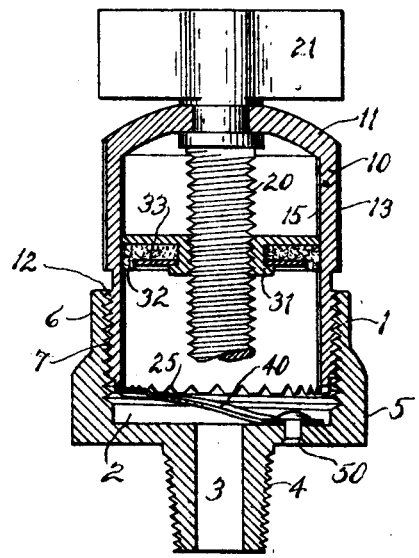
Figure 3:
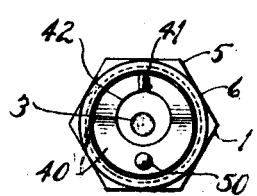
Figure 5:
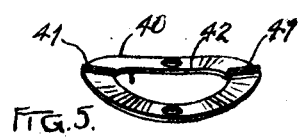
Figure 4:
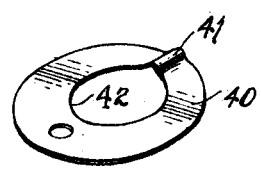

In the drawings, Figure 1 is a side elevation of my grease cup; Fig. 2 is a vertical central section thereof on an enlarged scale, showing the cap before it is turned home; Fig. 3 is a plan of the cup with the detent spring therein; Fig. 4 is a perspective view of the detent spring removed; Fig. 5 is a perspective view of a modified form of detent spring.

Referring by numerals to the parts shown in the drawings, 1 represents the cup, which has an interior chamber 2 and an exit opening 3, leading from the upper face of the base of the cup and forming the bore of a projecting nipple having an external thread 4. The exterior of the cup is formed angularly near the base, as shown at 5, and above this is preferably a cylindrical portion 6. The inner wall of the cup is provided with threads 7.

The cap is designated 10. It has a suitable top, which may be of dome-shape, as shown at 11, and has a cylindrical wall provided with external threads 12 adapted to screw into the threads 7. Above these threads is provided suitable knurling 13, which may be in the form of up and down grooves and projections, as shown.

Journaled in the top of the cap is a screw 20, which has a handle or thumb piece 21 above the cap, by which it may be turned, and, threaded on this screw within the cap is a suitable plunger. This plunger is shown as comprising a metal member, 31, a leather or flexible washer 32 associated therewith, and a metal washer 33 holding the leather washer in place. The metal member 31 is preferably flanged to hold the leather washer and the washer 33 in place. The interior of the cup is provided with one or more longitudinal grooves 15, into which extend one or more projections of the plunger, so that this plunger may slide but can not rotate. Accordingly, when the wing 21 is turned in the proper direction, the plunger may be caused to move downwardly and force the grease in the cup through the bore 3.

To effectively lock the cap to the cup without in any way interfering with the appearance of the device, I provide an annular spring 40, shown in perspective in Figs. 4 and 5. This spring is riveted, or otherwise secured, to the upper face of the base of the cup at the side of the bore 3 and extends around the prolongation of that bore, and has a projection adapted to engage notches in the lower edge of the cap.

The spring shown in Figs. 2 and 4 is held by a rivet 50, and diametrically opposite the rivet is the upward projection 41, formed by bending the material of the spring. This projection coacts with any of a number of notches 25 in the lower edge of the cap wall. As the cap is being screwed into place, these notches engage the projection and bend the spring downwardly so that, when the cap comes into the final position shown in Fig. 1, it is effectively detained by the spring. This detaining is sufficient so that a slight force applied to the cap will not displace it, while, to remove it, it is only necessary to grip the cap firmly and rotate it in the direction to screw it out of the cup. This form of spring is well adapted for small grease cups, for even with small sizes there is a considerable effective length of spring between the point engaging the cap and the point where the spring is secured to the cup.

The spring shown in Fig. 5 is adapted for larger size grease cups. In this form of spring are two rivet holes diametrically opposite each other and projections 41 on each side of the spring between the rivets, by which the spring is held to the cup. In a large cup there is room for this style spring to have sufficient effective length of spring metal between the rivets and the projections 41 to allow the necessary action of the spring.

With either form of spring, the opening 42 in the spring allows easy access to the bore 3, so that the spring does not interfere with the course of the grease. The spring is entirely out of sight, and, at the same time, it effectively locks the parts of the grease cup together, as desired. When said parts are locked together, the grease is fed by turning the wing 21 and causing the plunger to move downwardly toward the bore 3.

Having thus described my invention, what I claim is:

1. In a grease cup, the combination of a cup portion having an internally threaded wall and having a nipple projecting from its base with an internal bore, an annular spring secured to said base within the wall on one side of the opening of the spring, the opening of the spring being opposite the entrance to said bore, said spring having a projection, and a cap having an external thread and screwing into the internally threaded wall of the cup and notched to coact with said projection.

2. In a grease cup, the combination of a cup, a cap screw threaded thereto, and an annular spring having an opening for the passage of grease and secured to the cup at the side of such opening, and having an engagement with the lower edge of the cap.

3. In a grease cup, the combination of a cup, a cap screw threaded thereto and having a notch at its lower edge, and a spring washer having an opening for the passage of grease and secured at the side of such opening to the cup, said washer having a projection adapted to engage said notch.

4. In a grease cup, the combination of a cup having an internally threaded wall rising from the upper face of its base, the cup having an exit opening leading from said upper face, a cap screwing into said wall and having a notch at its lower edge, and a spring member secured to the upper face of the base of the cup at the side of the opening, said member also having at the side of the opening a projection adapted to engage said notch.

5. In a grease cup, the combination of a cup, a cap screw threaded thereto, and a spring washer within the cup having an opening for the passage of grease and secured at one side of such opening to the cup, and at the other side having a spring engagement with the lower edge of the cap.

6. In a grease cup, the combination of a cup portion having an internally threaded wall and having an externally threaded nipple projecting from its base with an internal bore, a spring washer secured to said base within the wall on one side of the opening of the washer, said washer having an upwardly extending projection on the opposite side of its opening, a cap having an external thread and screwing into the internally threaded wall of the cup, said cap being notched at its bottom edge to engage said projection, a plunger within the cap, and a screw for operating said plunger having a turning means above the cap.

7. In a grease cup, the combination of a cup having an internally threaded wall rising from the upper face of its base, the cup having an externally threaded projecting nipple, said cup having a bore leading from said upper face through the nipple, a cap having an externally threaded wall screwing into the internally threaded wall of the cup, a plunger within the cap, means for moving the plunger up and down in the cap, said cap having its lower edge notched, and a spring within the cup secured to said upper face of the base of the cup on one side of the bore and engaging the cap on the opposite side thereof.

In testimony whereof, I hereunto affix my signature in the presence of two witnesses.

OSCAR ZERK.

Witnesses:
ALBERT H. BATES,
BRENNAN B. WEST.